(12) United States Patent
Poole et al.

(10) Patent No.: US 12,314,173 B2
(45) Date of Patent: May 27, 2025

(54) MEMORY MANAGEMENT USING BUILD IDENTIFICATIONS (71) Applicant: INTERNATIONAL BUSINESS MACHINES CORPORATION, Armonk, NY (US)

(72) Inventors: Christopher John Poole, Hampshire (GB); Ashley Robertson, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/653,883

(22) Filed: Mar. 8, 2022

(65) Prior Publication Data
US 2023/0289286 A1 Sep. 14, 2023

(51) Int. Cl.
*G06F 12/02* (2006.01)
*G06F 16/17* (2019.01)

(52) U.S. Cl.
CPC ...... *G06F 12/0261* (2013.01); *G06F 16/1727* (2019.01); *G06F 2212/1044* (2013.01)

(58) Field of Classification Search
CPC ............. G06F 12/0261; G06F 16/1727; G06F 2212/1044
See application file for complete search history.

(56) References Cited

U.S. PATENT DOCUMENTS

| | | | | |
|---|---|---|---|---|
| 7,565,386 B2* | 7/2009 | Joisha | | G06F 8/443 |
| 9,626,291 B2* | 4/2017 | Schreter | | G06F 12/0261 |
| 10,102,120 B2* | 10/2018 | Lee | | G06F 3/0619 |
| 10,481,986 B2 | 11/2019 | Thomsen | | |
| 10,613,970 B1* | 4/2020 | Jammula | | G06F 11/3688 |
| 10,642,829 B2* | 5/2020 | Caudy | | G06F 16/9535 |
| 10,853,242 B2* | 12/2020 | Bryant | | G06F 12/0261 |
| 12,112,297 B1* | 10/2024 | Pandey | | G06Q 10/0639 |
| 2007/0185943 A1* | 8/2007 | Bacon | | G06F 12/0261 |
| 2021/0089297 A1* | 3/2021 | Duvall | | G06F 8/30 |

OTHER PUBLICATIONS

Mell et al. The NIST Definition of Cloud Computing, Sep. 2011.*

(Continued)

*Primary Examiner* — Matthew J Ellis
(74) *Attorney, Agent, or Firm* — James L. Olsen (57) ABSTRACT An apparatus, a method, and computer program product are provided that track build identifications of a project to determine when their associated files should be deallocated by a garbage collection system. The method includes receiving, by a continuous integration server, a payload from a source control management (SCM) system. The method also includes detecting at least one build identification (ID) within the payload and analyzing metadata contained within the payload to determine an adjustment to the reference counter for the build ID. The method further includes adjusting, based on the analysis, the reference counter relating to the build ID in a reference table, and passing the table to a garbage collection system for memory management purposes of the continuous integration server. The garbage collection system can then delete files associated with the build IDs that have reference counters at or below zero.

14 Claims, 5 Drawing Sheets

(56) References Cited

OTHER PUBLICATIONS

Zhao, Chenyu, et al. "Robust multimodal failure detection for microservice systems." Proceedings of the 29th ACM SIGKDD Conference on Knowledge Discovery and Data Mining. 2023. (Year: 2023).*

Zhao, et al. 2021. "Identifying bad software changes via multimodal anomaly detection for online service systems" 2021, ACM, 527-539. https://doi.org/10.1145/3468264.3468543 (Year: 2021).*

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

MEMORY MANAGEMENT USING BUILD IDENTIFICATIONS

BACKGROUND

The present disclosure relates to memory management using garbage collection techniques and, more specifically, to tracking build identifications of a project to determine when their associated files should be deallocated by a garbage collection system.

Continuous integration is a software development practice where developers regularly merge their code changes into a central repository, after which automated builds and tests are run. With continuous integration, developers frequently commit to a shared repository using a version control system. Prior to each commit, developers may choose to run local unit tests on their code as an extra verification layer before integrating that piece of code. A continuous integration service can automatically build and run unit tests on the new code changes to detect any potential errors.

Programs running on a finite amount of memory may need to recover the storage used by objects that are no longer needed for computation. Memory, used by objects stored in a heap, can be reclaimed using explicit deallocation (e.g., C's free or C++'s delete operators) or automatically by the run-time system, also known as garbage collection. Explicit deallocation allows a programmer to specify when an object is no longer needed and can release the memory used by the object. Garbage collection reclaims memory by evaluating the heap automatically without a programmer needing to explicitly release the unneeded object.

SUMMARY

Embodiments of the present disclosure include a method that analyzes build identifications of a project to determine what portions of the project can be garbage collected. The method includes receiving, by a continuous integration server, a payload from a source control management (SCM) system. The method also includes detecting at least one build identification (ID) within the payload and analyzing metadata contained within the payload to determine an adjustment to the reference counter for the build ID. The method further includes adjusting, based on the analysis, the reference counter relating to the build ID in a reference table and passing the table to a garbage collection system for memory management purposes of the continuous integration server. The garbage collection system can then delete files associated with the build IDs that have reference counters at or below zero.

Additional embodiments of the present disclosure include a computer program product that analyzes build identifications of a project to determine what portions of the project can be garbage collected, one or more computer-readable storage medium, and program instructions stored on the one or more computer-readable storage media, the program instruction executable by a processor to cause the processor to perform a method. The method includes receiving, by a continuous integration server, a payload from a source control management (SCM) system. The method also includes detecting at least one build identification (ID) within the payload and analyzing metadata contained within the payload to determine an adjustment to the reference counter for the build ID. The method further includes adjusting, based on the analysis, the reference counter relating to the build ID in a reference table and passing the table to a garbage collection system for memory management purposes of the continuous integration server. The garbage collection system can then delete files associated with the build IDs that have reference counters at or below zero.

Further embodiments of the present disclosure include a system for analyzing build identifications of a project to determine what portions of the project can be garbage collected. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to memory management using garbage collection techniques and, more specifically, to tracking build identifications of a project to determine when their associated files should be deallocated by a garbage collection system. While the present disclosure is not necessarily limited to such applications, various aspects of the disclosure may be appreciated through a discussion of various examples using this context.

Source control management (SCM) systems manage source code generated by developers that can potentially have thousands of source files for a project. These SCM systems act as repositories that have control systems in place that allow code to be changed by different developers at one time. The control systems can utilize various mechanisms, such as distributed version control systems (DVCS), that provide every developer a copy of the entire repository along with the full history that can be stored locally by the developer. When a developer wishes to integrate their work, the local repository is synced in a peer-to-peer fashion.

Continuous integration (CI) servers can provide development teams with tools that monitor source code repositories and can automatically run test suites on each new commit. Logs and various pieces of information can be generated with each test that provides data such as an overview of the history of a test job, trend data, test coverage, and whether code failed during testing.

CI software, operating on a CI server, can poll source code repositories for changes, and that can also be triggered by hooks. A test job can be triggered if a change in the source code repository is detected. The test job can either be configured centrally in the CI server or by information included in the source code repository. Once the CI server knows which tests to execute and in which environments, a worker node can execute the test. The worker node can then report its results back to the CI server, which can send a notification to the development team as well as generate logs of the tests that were run.

In addition to providing notifications, CI servers can also accommodate workflows based on feature branches and merge requests or pull requests (e.g., a second person reviews and merges the changes to the code). In these situations, the CI servers can test not just a feature branch but also the result of a merge between the feature branch and the development branch. This type of testing can determine whether there is a break during the merging process. Other metrics, such as code coverage, complexity, coding style, and architectural constraint checking, can also be generated during the testing process of the code.

The information generated by the tests can be stored in a CI server that can later be retrieved by developers for analysis. Garbage collection tools can be used by a CI server as memory management to ensure that there is enough memory to store the newest logs from the tests that are being performed. These garbage collection tools can be either explicitly run or implicitly run. For example, an implicit garbage collection can periodically, or at some interval, remove stored logs that have been stored on the CI server for at least thirty days.

Limitations on memory management of CI servers remain, however, as logs that are still being evaluated can be deleted by the garbage collection system, which can result in delays for the development team attempting to troubleshoot a problem in the code. CI servers are typically configured to store a log in history for each job that is run on the server. Garbage collection is used to maintain disk space on the server and clear out older logs once after being stored for a predetermined period, or the build logs are removed individually on a case-by-case basis. Typically, manual intervention is required because the garbage collection techniques used in CI servers do not adequately remove logs to maintain sufficient disk space, or logs still being used are inadvertently deleted. For example, a development team may document a bug to be fixed, and in the description of that bug, a reference to the build ID and log are provided. When the development team goes to correct the issues generating the bug, they will need to access the logs to get a better understanding of the problem. However, in some instances, those logs have been deleted by the garbage collection system because they were older logs and were automatically removed.

Embodiments of the present disclosure may overcome the above, and other problems, by providing a build tracking module for tracking build logs that are still being used and referenced by a development team. The build tracking module can track the reference counts of the build logs and can provide or extend the existing garbage collection routines with functionality to only have builds that are no longer referenced to be deleted from memory. The builds and corresponding logs that are still referenced externally are preserved, thereby ensuring that logs are not deleted prior to a development team reviewing them to correct potential bug issues in the software code.

More specifically, the build tracking module stores a lookup table with counts that map a build identification (ID) to the number of references that build ID has in a payload of builds that are to be tested by the CI server. The build tracking module can parse the payload of the request for build IDs. Once found, the build ID count can be incremented for each ID discovered. The count can correspond to the number of times a build ID is referenced by a payload. Additionally, when an issue or pull request is triggered to be closed, the SCM system storing the repository can transmit similar data to the CI server, where the build tracking module can parse the information and decrement the build ID counters for any build IDs discovered in the request.

When garbage collection is performed on the CI server, either manually or automatically, the garbage collection system can request the build IDs that have an external usage count of zero or less than zero. If the build ID is at, or below, zero, that build information, and its corresponding logs, can be removed. This technique can be used separately or in conjunction with other factors such as the age of the build and current disk space on the CI server.

By way of example, but not by limitation, an untested build of software code is transmitted to the CI server for testing. Upon testing, errors occur when the build is tested. The CI server generates logs that can detail the specifics of the error. A ticket can be generated by the SCM system, indicating that the build has an error that needs to be corrected. Included within that ticket are the build, the build ID, and other information that can assist in rectifying the issue. That information can be transmitted to the CI server, either separately or within some kind of payload. The build tracking module can then analyze the metadata contained within the payload or ticket. As the ticket indicates that it is an open ticket that requires resolution, the build tracking module can track that information by tracking the build ID and incrementing a usage counter associated with that ID. For instance, if this is the first time this build ID has been referenced, then the usage counter would be set at 1. When information is received, such as the ticket being resolved, the build ID counter can be decremented. When the usage counter is set at or below 0, then the garbage collection system can delete the associated files with that build ID.

In some embodiments, the build tracking module makes a call to the SCM system prior to deleting logs relating to a build ID. The call can request whether the build ID is still being referenced within an open ticket or issue within the SCM system. Upon receiving a response, the build tracking module can increment the reference count for that build ID based on the number of references received, or the garbage collection system can proceed to remove the files for storage on the CI server.

In some embodiments, the build tracking module is configured as an application programming interface (API) that receives requests (e.g., RESTful JavaScript Object Notation (JSON) requests) from the SCM system. Metadata within those requests can be analyzed for build IDs or links to building IDs indicating whether the reference count should be incremented or decremented. Upon analyzing the metadata within the request, the build tracking module can either increment or decrement the count of the build IDs referenced in the request.

In some embodiments, the build tracking module includes a payload parser that parses the payload to determine whether to increment or decrement a build ID. When an issue, defect, or bug occurs to the source code being tested, a ticket is created that links to the build IDs and/or logs associated with that issue, defect, or bug. The payload parser can pull that ticket to analyze the metadata within the ticket to determine whether the build ID should be incremented or decremented.

In some embodiments, a configuration file is used by the payload parser to determine whether to increment or decrement a build ID. The configuration file can include label meanings that can assist the payload parser in making a determination as to whether or not a build ID should be incremented or decremented. For example, labels such as "open, ongoing, new, unresolved" indicate that a build ID is still being referenced with a ticket and should be incremented. Labels such as "closed, remove, resolved, unneeded" can indicate that a build ID is no longer referenced by a ticket and that the build ID counter should be decremented.

In some embodiments, the build tracking module receives metadata from the SCM system that directly indicates whether or not to increment or decrement the build ID counters. For example, the SCM system can transmit metadata that references a ticket that is closed and that all build IDs referenced by that ticket should be decremented. In some embodiments, the SCM system may also directly indicate in the metadata that the count should be set to zero to allow the garbage collection system to delete the files associated with a particular build ID that was set to zero.

Figure 1:
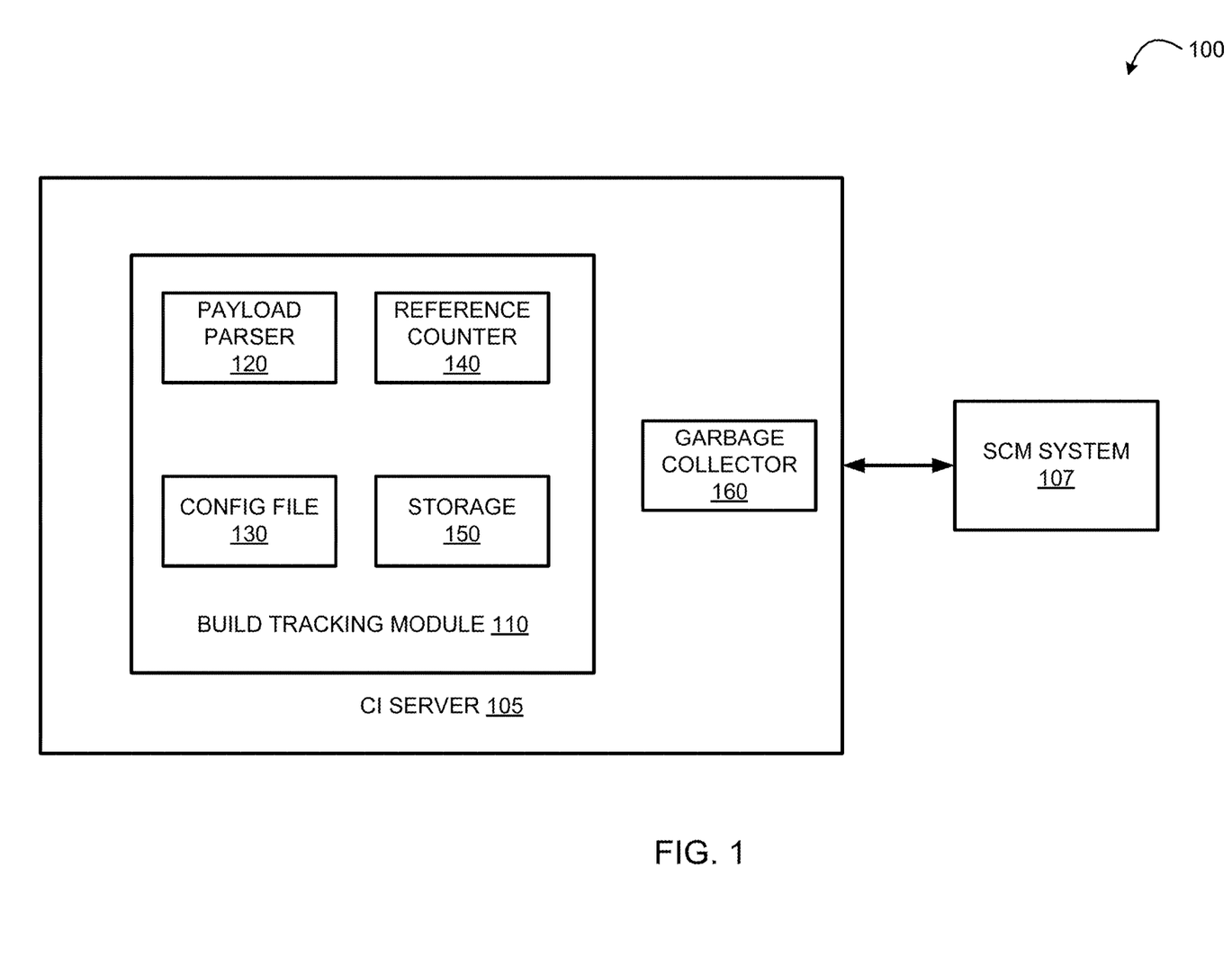
FIG. 1 is a block diagram illustrating an operation of the primary operational elements of a build tracking module used by one or more embodiments of the present disclosure.

FIG. 1 is a block diagram illustrating a computing environment 100 for tracking build identifications of a project to determine when their associated files should be deallocated by a garbage collection system. The computing environment 100 includes a CI server 105 and an SCM system 107. The CI server 105 includes a build tracking module 110, including a payload parser 120, a configuration file 130, a reference counter 140, and a storage 150. For purposes of the present description, it will be assumed that the illustrative embodiments are being implemented as part of a repository and specifically on a continuous integration that can poll source code repositories for changes and that can also be triggered by hooks. However, this is only one possible implementation and is not intended to be limiting on the present disclosure. Other implementations in which virtual machines and/or containers are utilized may also be used without departing from the spirit and scope of the present disclosure.

The CI server 105 is a component of the computing environment 100 configured to manage and test code from the SCM system 107. When code is committed to the SCM system 107, the CI server 105 can initiate a build and test that build under different settings. The CI server 105 can then document the results of the build test, where the documentation provides information regarding the test. For example, the documentation may indicate that a bug occurred while the build was being tested in a Linux environment. Additional information can also be provided as to the variety of specifics of the bug. The CI server 105 is further configured to automatically test the build once code is committed on the SCM system 107 side. The CI server 105 can test the code and provide feedback without having a developer, or the committer, initiate a build test.

In some embodiments, the CI server 105 polls the SCM system 107 for changes in the code that it is monitoring. The CI server 105 can also be notified via a hook whenever a build test is requested. If the polling detects a change in the source code repository, a test job is triggered. The job can either be configured centrally in the CI server 105 or in the SCM system 107. Once the CI server 105 knows which tests to execute and in which environments, those tests will be executed, and documentation on how the tests performed will be generated. The results and build logs can be stored within the CI server 105, and a notification can be transmitted back to the SCM system 107 indicating the tests have been performed on a build. It should be noted that the CI server 105 can operate as an on-premise server within an IT infrastructure or as a cloud-based or software as a service (SaaS) server.

The SCM system 107 is a component of the computing environment 100 configured to store and manage changes to the source code of a project. The SCM system 107 can keep track of each version of each file in a coding project, can generate a timestamp for when that version was created and can notate the author of those changes. The SCM system 107 can also provide a running history of code development and help resolve conflicts when merging contributions from multiple sources.

In some embodiments, the SCM system 107 operates allows contributors to create a copy of the repository known as a branch. Using this branch, a contributor can work on the code independently from the stable version of the codebase. When the contributor is ready with the changes they made, they can store them as a set of differences, known as a commit. That change can trigger the CI server 105 to test the code and generate documentation based on those tests.

The build tracking module 110 is a component of the CI server 105 configured to track build IDs of builds tested on the CI server 105 to determine when their associated files should be deallocated by a garbage collection system, in accordance with embodiments of the present disclosure. The build tracking module 110 includes a payload parser 120, a configuration file 130, a reference counter 140, and storage 150.

The payload parser 120 is a component of the build tracking module 110 configured to read payloads from the SCM system 107 and to count occurrences of build IDs known to the system. The identified build IDs can then be added to a reference table maintained by the build tracking module 110. Functionally, the payload parser 120 can parse through a received payload and detect build IDs mentioned within the payload. While parsing, the payload parser 120 can read through labeled data to determine if a particular build should be ignored or counted.

The payload parser 120 is further configured to determine if metadata within a payload, or otherwise, indicates whether a build ID counter should be decremented. For example, if metadata indicates that a ticket has been resolved, that has links to a particular build ID, that build ID can be decremented since the ticket no longer requires access to the information relating to the build ID.

In some embodiments, the payload parser 120 utilizes a configuration file 130 to assist in parsing through metadata and payloads. The configuration file 130 can include information that translates label meanings such that it allows the payload parser 120 to determine whether to increment or decrement a counter. The translations can also be included for pipelines, metadata, and the like. The labels can be predetermined by an administrator that can adjust the configuration file 130 to include other translations that can assist the payload parser in determining whether to keep or ignore a build ID. For example, configuration file 130 can keep build IDs that relate to and are mentioned in an issue or ticket. Additionally, or separately, build IDs can be ignored if the metadata indicates that a build ID is not relating to a ticket or issue, but rather, some other component relating to the CI server 105 that does not require the build ID to be tracked at that time.

In some embodiments, the payload parser 120 utilizes natural language processing to parse the payload to detect build IDs and determine with to keep or disregard mentions of those build IDs. Natural language techniques can also be used to analyze and determine the usage of the build IDs to determine whether a build ID counter should be incremented or decremented.

The reference counter 140 is a component of the build tracking module 110 configured to generate and maintain a reference table that includes build IDs and counters for those build IDs. Each entry in the reference table can include a build ID identified by the payload parser 120 and a counter that can be incremented or decremented based on the usage of that build ID. For example, build ID 1234 can be an entry in the reference table with a corresponding counter of 3. The reference counter 140 can map counts of build IDs parsed by the payload parser 120 to their occurrence. Once a build ID is placed within the reference table, its corresponding counter can either be incremented or decremented based on the information and metadata relating to the mention of that build ID.

The storage 150 is a component of the build tracking module 110 configured to store data within the CI server 105. The data include, but are not limited to payloads, builds, logs, source code, and other information relating to the operation and use of the CI server 105. Examples of the storage 150 include but are not limited to tape systems (e.g., tape drives, tape autoloaders, tape libraries), disk systems, storage arrays, magnetic drives, solid-state drives, and optical drives. In some embodiments, the storage 150 also stores the reference table.

The garbage collection system 160 is a component of the CI server 105 configured to perform memory management operation and garbage collection techniques on the CI server 105. The garbage collection system 160 can attempt to reclaim memory (e.g., files, logs) allocated within the CI server 105, and that are no longer referenced.

It is noted that FIG. 1 is intended to depict the representative major components of an exemplary computing environment 100. In some embodiments, individual components may have greater or less complexity than as represented in FIG. 1, components other than or in addition to those shown in FIG. 1 may be present, and the number, type, and configuration of such components may vary.

Thus, the illustrative embodiments provide mechanisms for tracking the build IDs of builds tested on a CI server to determine when their associated filed should be deallocated by a garbage collection system. Additionally, the mechanisms of the illustrative embodiments may operate in conjunction with other DevOps systems and/or other downstream computing systems to perform actions that ensure storage space available for build documentation, which may include outputting notifications, via user interfaces that may provide functionality for manually selecting which documentation is no longer necessary and is eligible for deallocation.

Figure 2:
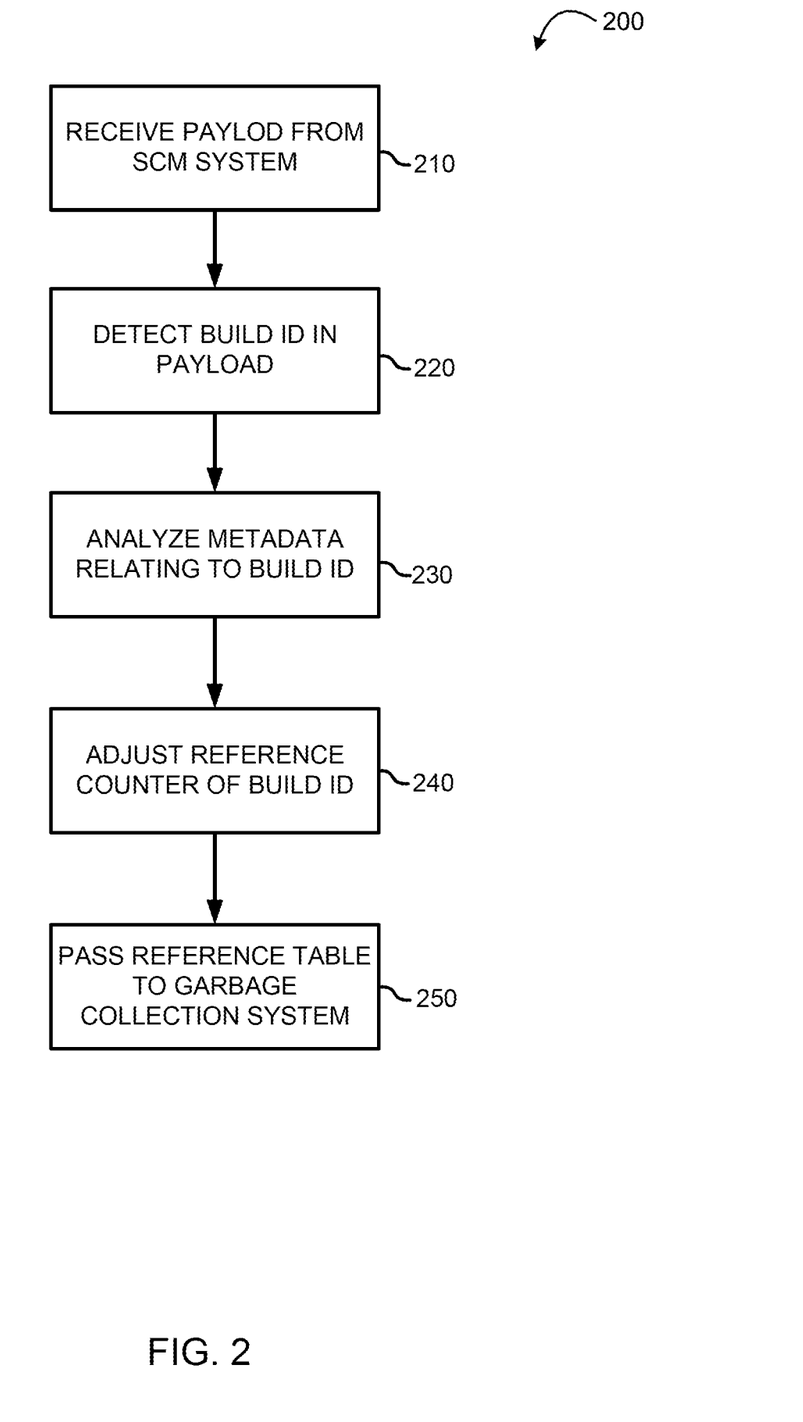
FIG. 2 is a flow diagram illustrating a process of tracking build identifications of a project to determine when their associated filed should be deallocated and performed in accordance with embodiments of the present disclosure.

FIG. 2 is a flow diagram illustrating a process 200 of tracking build IDS of a project to determine when their associated files should be deallocated by a garbage collection system, in accordance with embodiments of the present disclosure. As shown in FIG. 2, the process 200 begins by CI server 105 receiving a payload from the SCM system 107. This is illustrated at step 210. The payload can include requests to build code once a commit has been performed, requests for tests of those build in under various conditions in various environments, as well as additional information relating to builds, build IDs, and their accompanying files, logs, and metadata. In some embodiments, the CI server 105 receives metadata from the SCM system 107 that is not in the form of a payload, but rather, information that is pulled by the CI server 105.

The payload parser 120 detects at least one build ID within the payload by parsing through the information contained within the payload. This is illustrated at step 220. As the payload parser 120 parses through the payload, it can count occurrences of build IDs known to the system as well detect any new build IDs that are being referenced for the first time. The new build IDs can be added to a reference table that tracks the occurrences of build IDs.

The payload parser 120 analyzes metadata contained with the payload to determine adjustments to reference counter relating to the detected build IDs. This is illustrated at step 230. The metadata can include information that indicates that a build ID is linked within a ticket or issue that still requires resolution. Thus, that type of metadata can be used as an indicator to increment the reference counters for the build IDS linked within the ticket. Other metadata may indicate that a ticket has been resolved, and the accompanying build IDs linked to that resolved tickets can be decremented.

In some embodiments, the payload parser 120 utilizes a configuration file 130 to analyze the metadata when making a determination to accept or ignore a detected build ID. If the build ID is accepted and not ignored, the configuration file can also be used to determine whether the reference counter for the accepted build ID should be incremented or decremented. The configuration file 130 can include information that translates label meanings such that it allows the payload parser 120 to determine whether to increment or decrement a counter. The translations can also be included for pipelines, metadata, and the like. The labels can be predetermined by an administrator that can adjust the configuration file 130 to include other translations that can assist the payload parser in determining whether to keep or ignore a build ID.

The reference counter 140 adjusts the reference counter relating to the detected build ID based on the analysis performed by the payload parser 120. This is illustrated at step 240. The adjustment can increment the reference counter in the reference table when there is an indication in a payload or metadata, that the build ID is still needed, such as when there is a bug that needs to be resolved relating to that build ID. The adjustment can also be a decrement to the reference counter in the reference table when there is an indication in the payload or metadata that the build ID, and its accompanying files, are no longer needed.

The build tracking module 110 passes the reference table to a garbage collection system 160 operating within the CI server 105. This is illustrated at step 250. When garbage collection is performed on the CI server, either manually or automatically, the garbage collection system 160 can reference the build IDs that have an external usage count of zero, or less than zero, indicated by their reference counters. If the reference counter is at, or below, zero, that build information, and its corresponding logs, can be removed. This technique can be used separately, or in conjunction with, other factors such as the age of the build and current disk space on the CI server.

In some embodiments, when the garbage collection system 160 determines files relating to the build ID are scheduled for deletion, or deallocation, the CI sever 105 call the SCM system 107 to determine if any additional references associated with the build ID exist on the SCM system 107. Upon receiving additional metadata from the SCM system 107 relating to the build ID, that metadata can be analyzed to determine whether the build ID's reference counter should be adjusted. If the reference counter is incremented, then the garbage collection system 160 is prevented from deleting the related files. However, if the reference counter is not incremented, then the build ID's files and logs can be deleted by the garbage collection system 160.

Figure 3:
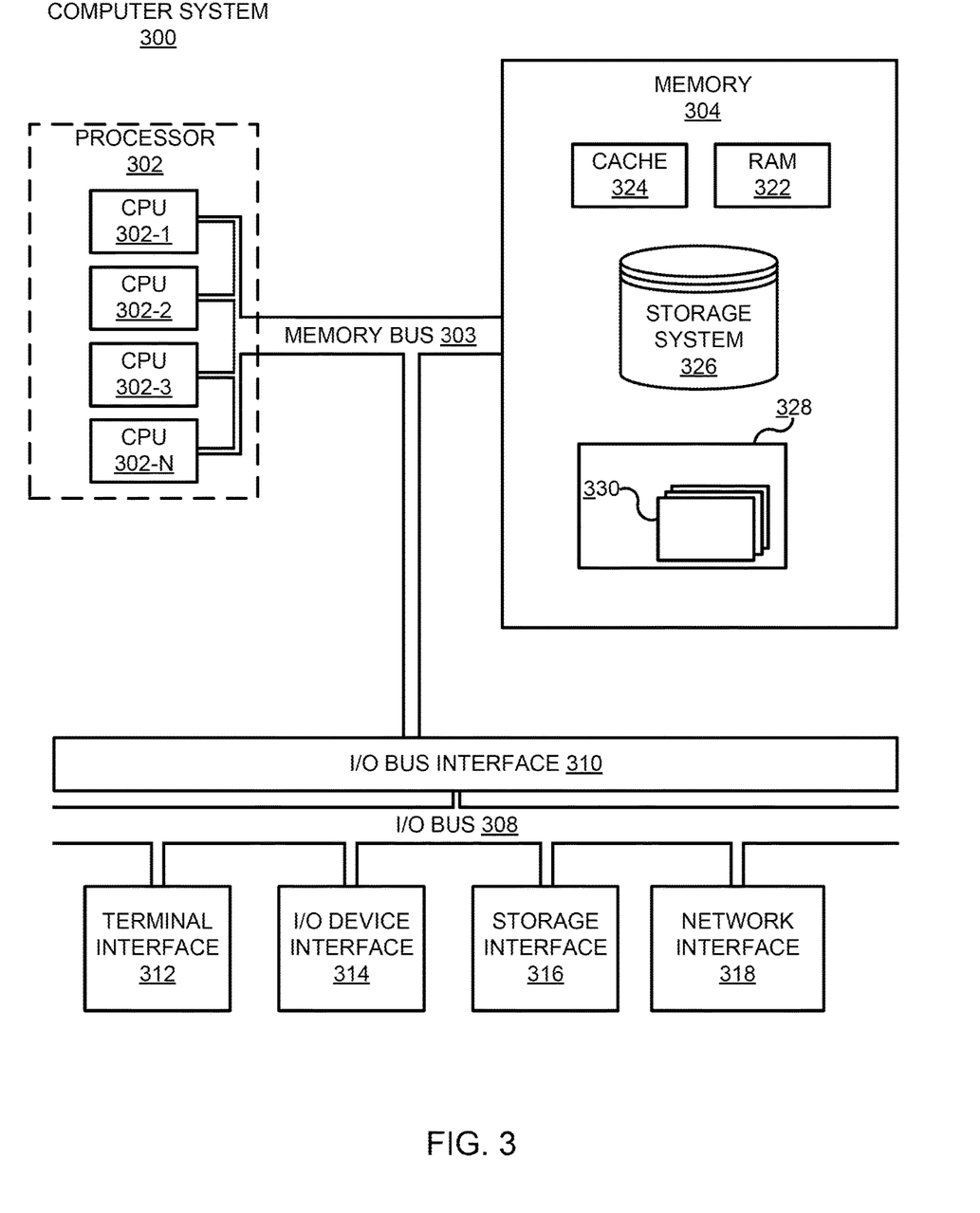
FIG. 3 is a high-level block diagram illustrating an example computer system that may be used in implementing one or more of the methods, tools, modules, and any related functions, described herein in which the disclosure may be implemented.

Referring now to FIG. 3, shown is a high-level block diagram of an example computer system 300 (e.g., the build tracking module 110) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, an I/O (Input/Output) device interface 314, a storage interface 316, and a network interface 318, all of which may be communicatively coupled, directly or indirectly, for inter-component communication via a memory bus 303, an I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments, the computer system 300 may alternatively be a single CPU system. Each processor 302 may execute instructions stored in the memory 304 and may include one or more levels of onboard cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments, some or all of the I/O devices may be connected directly to one or more system I/O buses.

In some embodiments, the computer system 300 may be a multi-user mainframe computer system, a single-user system, or a server computer or similar device that has little or no direct user interface but receives requests from other computer systems (clients). Further, in some embodiments, the computer system 300 may be implemented as a desktop computer, portable computer, laptop or notebook computer, tablet computer, pocket computer, telephone, smartphone, network switches or routers, or any other appropriate type of electronic device.

It is noted that FIG. 3 is intended to depict the major representative components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 (e.g., the build tracking module 110), may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 4:
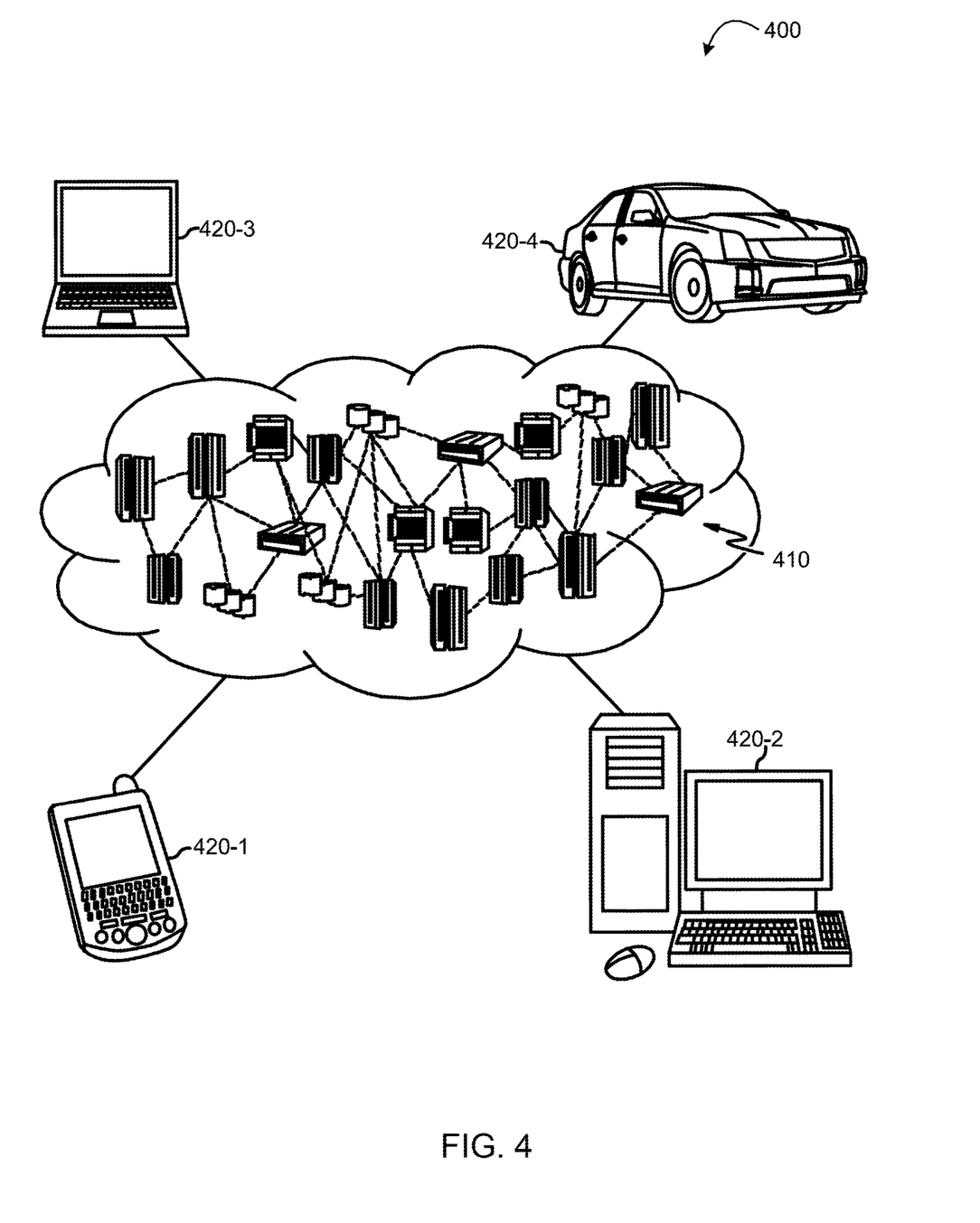
FIG. 4 depicts a cloud computing environment in accordance with embodiments of the present disclosure.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (P.D.A.) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
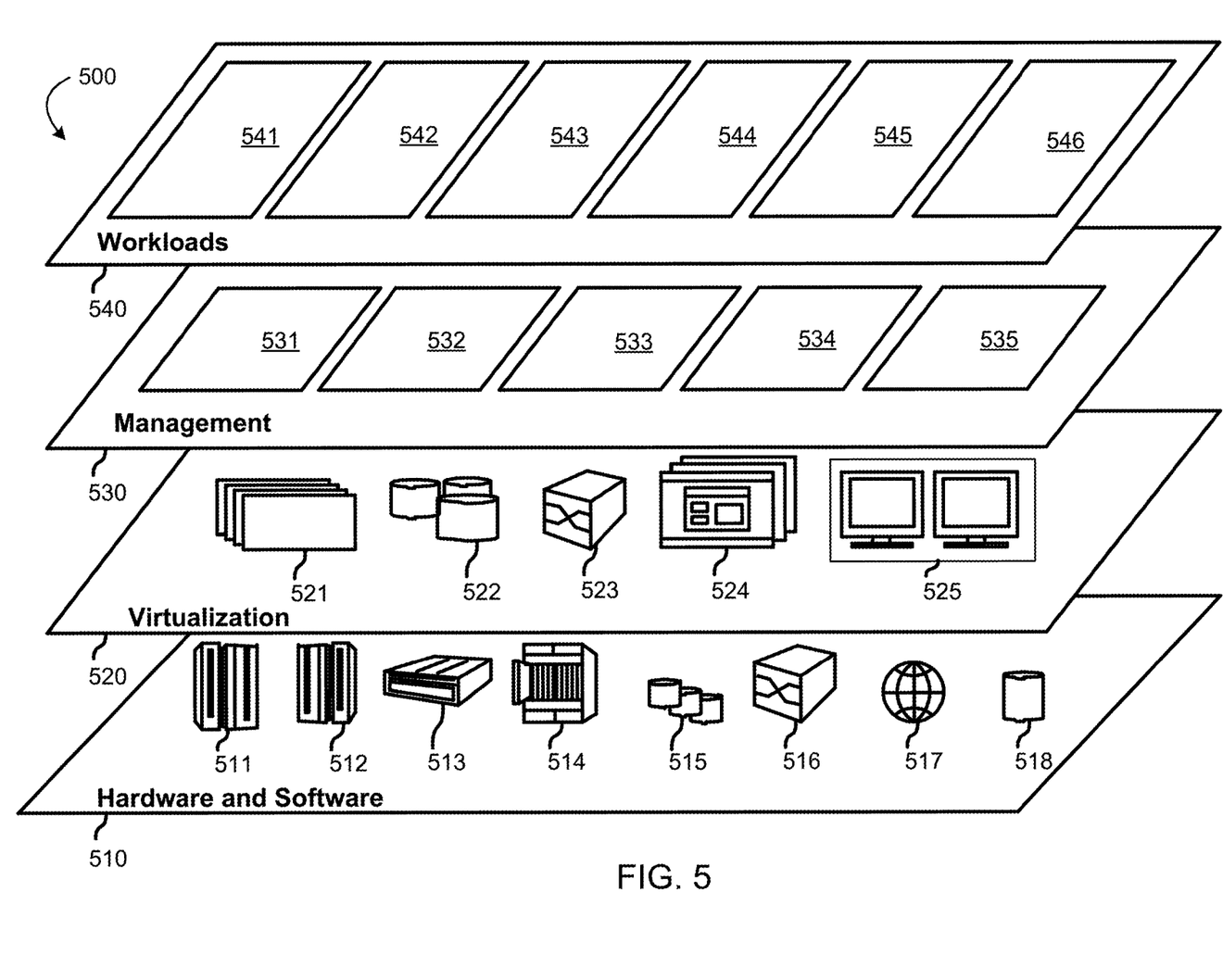
FIG. 5 depicts abstraction model layers in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 510 includes hardware and software components. Examples of hardware components include mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include mapping and navigation 541; software development and lifecycle management 542 (e.g., the build tracking module 110); virtual classroom education delivery 543; data analytics processing 544; transaction processing 545; and an analysis system 546.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a continuous integration server, an indication of a source code commit made to a source control management (SCM) system;
executing, by the continuous integration server, a test on the source code commit;
storing test results associated with the test executed on the source code commit within a build log corresponding to a build identification (ID) associated with the source code;
analyzing, using natural language processing, the test results within the build log and a ticket associated with the build ID to determine an adjustment to a reference counter for the build ID within a garbage collection reference table;
incrementing the reference counter for the build ID within the garbage collection reference table in response to the test results within the build log indicating that the source code commit failed the executed test and in response to the natural language processing analysis identifying a first label associated with the ticket indicating a ticket status of the ticket being open; and
passing the garbage collection reference table to a garbage collection system for memory management purposes of the continuous integration server, wherein the garbage collection system does not delete the build log and the ticket associated with the build ID based on the incremented reference counter for the build ID.

2. The computer-implemented method of claim 1, wherein the garbage collection system deletes files associated with build IDs with associated reference counters at zero in the garbage collection reference table.

3. The computer-implemented method of claim 1, further comprising:
determining files relating to the build ID are scheduled for deletion by the garbage collection system;
calling, by the continuous integration server, the SCM system for determining references associated with the build ID existing on the SCM system;
receiving, from the SCM system, additional metadata relating to the build ID;
analyzing the additional metadata to determine an adjustment to the reference counter for the build ID;
adjusting, based on the analysis, the reference counter relating to the build ID in the garbage collection reference table; and
passing the garbage collection reference table to the garbage collection system.

4. The computer-implemented method of claim 1, further comprising:
receiving an updated counter for the build ID from the SCM system; and
replacing a count for the reference counter relating to the build ID in the garbage collection reference table with the updated counter.

5. The computer-implemented method of claim 1, further comprising:
receiving, by the continuous integration server, additional metadata from the SCM system;
detecting a second build ID within the additional metadata;
analyzing the additional metadata to determine an adjustment to a reference counter for the second build ID;
adjusting, based on the analysis, the reference counter relating to the second build ID in the garbage collection reference table; and
passing the garbage collection reference table to the garbage collection system for memory management purposes of the continuous integration server.

6. A computer program product comprising a computer readable storage medium having computer readable instructions stored therein, wherein the computer readable instructions, when executed on a continuous integration server, causes the continuous integration server to:
receive an indication of a source code commit made to a source control management (SCM) system;
execute a test on the source code commit;
store test results associated with the test executed on the source code commit within a build log corresponding to a build identification (ID) associated with the source code;
analyze, using natural language processing, the test results within the build log and a ticket associated with the build ID to determine an adjustment to a reference counter for the build ID within a garbage collection reference table;
increment the reference counter for the build ID within the garbage collection reference table in response to the test results within the build log indicating that the source code commit failed the executed test and in response to the natural language processing analysis identifying a first label associated with the ticket indicating a ticket status of the ticket being open; and
pass the garbage collection reference table to a garbage collection system for memory management purposes of the continuous integration server, wherein the garbage collection system does not delete the build log and the ticket associated with the build ID based on the incremented reference counter for the build ID.

7. The computer program product of claim 6, wherein the garbage collection system deletes files associated with build IDs with associated reference counters at zero in the garbage collection reference table.

8. The computer program product of claim 6, further comprising instructions to cause the continuous integration server to:
determine files relating to the build ID are scheduled for deletion by the garbage collection system;
call the SCM system for determining references associated with the build ID existing on the SCM system;
receive, from the SCM system, additional metadata relating to the build ID;
analyze the additional metadata to determine an adjustment to the reference counter for the build ID;
adjust, based on the analysis, the reference counter relating to the build ID in the garbage collection reference table; and
pass the table to the garbage collection system.

9. The computer program product of claim 6, further comprising instructions to cause the continuous integration server to:
receive an updated counter for the build ID from the SCM system; and
replace a count for the reference counter relating to the build ID in the garbage collection reference table with the updated counter.

10. The computer program product of claim 6, further comprising instructions to cause the continuous integration server to:
receive additional metadata from the SCM system;
detect a second build ID within the additional metadata;
analyze the additional metadata to determine an adjustment to a reference counter for the second build ID;
adjust, based on the analysis, the reference counter relating to the second build ID in the garbage collection reference table; and
pass the garbage collection reference table to the garbage collection system for memory management purposes of the continuous integration server.

11. A continuous integration server comprising:
a processor; and
a memory coupled to the processor, wherein the memory comprises instructions which, when executed by the processor, cause the processor to:
receive an indication of a source code commit made to a source control management (SCM) system;
execute a test on the source code commit;
store test results associated with the test executed on the source code commit within a build log corresponding to a build identification (ID) associated with the source code;
analyze, using natural language processing, the test results within the build log and a ticket associated with the build ID to determine an adjustment to a reference counter for the build ID within a garbage collection reference table;
decrement the reference counter for the build ID within the garbage collection reference table in response to the test results within the build log indicating that the source code commit passed the executed test and in response to the natural language processing analysis identifying a first label associated with the ticket indicating a ticket status of the ticket being closed; and
pass the garbage collection reference table to a garbage collection system for memory management purposes of the continuous integration server, wherein the garbage collection system deletes the build log and the ticket associated with the build ID based on the decremented reference counter for the build ID.

12. The continuous integration server of claim 11, further comprising instructions to cause the processor to:
determine files relating to the build ID are scheduled for deletion by the garbage collection system;
call the SCM system for determining references associated with the build ID existing on the SCM system;
receive, from the SCM system, additional metadata relating to the build ID;
analyze the additional metadata to determine an adjustment to the reference counter for the build ID;
adjust, based on the analysis, the reference counter relating to the build ID in the garbage collection reference table; and
pass the garbage collection reference table to the garbage collection system.

13. The continuous integration server of claim 11, further comprising instructions to cause the processor to:
receive an updated counter for the build ID from the SCM system; and
replace a count for the reference counter relating to the build ID in the garbage collection reference table with the updated counter.

14. The continuous integration server of claim 11, further comprising instructions to cause the processor to:
receive additional metadata from the SCM system;
detect a second build ID within the additional metadata;
analyze the additional metadata to determine an adjustment to a reference counter for the second build ID;
adjust, based on the analysis, the reference counter relating to the second build ID in the garbage collection reference table; and
pass the garbage collection reference table to the garbage collection system for memory management purposes of the continuous integration server.

* * * * *